US012734814B2

(12) United States Patent
Nishiwaki et al.

(10) Patent No.: US 12,734,814 B2
(45) Date of Patent: Sep. 15, 2026

(54) INK JET RECORDING METHOD AND INK JET RECORDING APPARATUS

(71) Applicant: CANON KABUSHIKI KAISHA, Tokyo (JP)

(72) Inventors: Yuko Nishiwaki, Tokyo (JP); Soichi Nagai, Kanagawa (JP); Atsuhito Yoshizawa, Tokyo (JP); Eriko Yoshino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 18/796,734

(22) Filed: Aug. 7, 2024

(65) Prior Publication Data

US 2025/0050646 A1 Feb. 13, 2025

(30) Foreign Application Priority Data

Aug. 7, 2023 (JP) ................................ 2023-128302
Jul. 23, 2024 (JP) ................................ 2024-117457

(51) Int. Cl.
*B41J 2/175* (2006.01)
*B41J 2/21* (2006.01)
*B41J 29/02* (2006.01)

(52) U.S. Cl.
CPC ........... *B41J 2/17513* (2013.01); *B41J 2/175* (2013.01); *B41J 2/17509* (2013.01); *B41J 2/1752* (2013.01); *B41J 2/17553* (2013.01); *B41J 2/21* (2013.01); *B41J 29/02* (2013.01)

(58) Field of Classification Search
CPC .... B41J 2/17513; B41J 2/175; B41J 2/17509; B41J 2/1752; B41J 2/17553; B41J 2/21; B41J 29/02
See application file for complete search history.

(56) References Cited

U.S. PATENT DOCUMENTS

| | | | |
|---|---|---|---|
| 7,648,943 | B2 | 1/2010 | Fujiwara et al. |
| 8,025,382 | B2 | 9/2011 | Tajima |
| 8,408,691 | B2 | 4/2013 | Koike et al. |
| 8,491,715 | B2 | 7/2013 | Gouda et al. |
| 8,623,101 | B2 | 1/2014 | Tateishi et al. |

(Continued)

FOREIGN PATENT DOCUMENTS

| | | | |
|---|---|---|---|
| JP | H10306221 | A | 11/1998 |
| JP | 2006143989 | A | 6/2006 |

(Continued)

*Primary Examiner* — Henok D Legesse
(74) *Attorney, Agent, or Firm* — Venable LLP

(57) ABSTRACT

Provided is an ink jet recording method, while the strength of the recording unit is maintained, an image having a high quality with reduced bleeding can be recorded. The ink jet recording method includes recording an image through use of an ink jet recording apparatus including an aqueous ink, an ink storage portion, and a recording head. The ink storage portion includes three or more storage parts divided independently of each other by a partition portion arranged orthogonal to a longitudinal direction of the ink storage portion, and the storage parts are arrayed in one predetermined direction. The aqueous ink includes a cyan ink, a magenta ink and a yellow ink and the ink corresponding to the ejection orifice array arranged at a middle out of the three rows of ejection orifice arrays has a smallest dynamic surface tension γ10 at a lifetime of 10 milliseconds.

13 Claims, 9 Drawing Sheets

(56) References Cited

U.S. PATENT DOCUMENTS

| | | | | |
|---|---|---|---|---|
| 8,987,348 | B2 | 3/2015 | Mukae et al. | |
| 9,789,698 | B2 | 10/2017 | Nagai et al. | |
| 12,005,726 | B2 | 6/2024 | Nakata et al. | |
| 2006/0009357 | A1 | 1/2006 | Fujiwara et al. | |
| 2008/0136880 | A1 | 6/2008 | Tajima | |
| 2008/0280043 | A1* | 11/2008 | Moribe | C09D 11/40 427/256 |
| 2012/0141692 | A1* | 6/2012 | Sato | B41J 2/14 427/561 |
| 2013/0284064 | A1 | 10/2013 | Tateishi et al. | |
| 2022/0242155 | A1 | 8/2022 | Tajima et al. | |
| 2023/0158809 | A1 | 5/2023 | Yoshida et al. | |

FOREIGN PATENT DOCUMENTS

| | | | |
|---|---|---|---|
| JP | 2007038673 | A | 2/2007 |
| JP | 2008142935 | A | 6/2008 |
| JP | 2012149212 | A | 8/2012 |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, there is an increasing demand for an ink jet recording apparatus for household use due to an increase of remote work at home and the like. Further, for household use, the ink jet recording apparatus is desired to be further downsized. For downsizing of the ink jet recording apparatus, downsizing of a recording head and an ink storage portion is essential. For example, there is known an ink jet recording apparatus having mounted thereon a recording unit downsized by integrating the ink storage portion and the recording head with each other.

Some of those ink jet recording apparatus adopt a recording head employing a system of ejecting ink by an action of thermal energy from the viewpoint that the ink jet recording apparatus can be designed to be more downsized. Further, the recording head has been devised to be downsized by providing ejection orifice arrays for ejecting respective inks of a plurality of colors in the same recording element substrate. Moreover, some recording units are downsized by bonding the recording head to the ink storage portion without intermediation of any other member. In addition, the apparatus is downsized by forming the ink storage portion from a thermoplastic resin to reduce the weight of the recording unit, and decreasing the rigidity required for a carriage portion.

However, the ink storage portion formed from only a thermoplastic resin has problems of being liable to be deformed and being liable to crack due to an external pressure such as an impact applied by falling. In order to solve such a problem, there has been proposed an ink storage container formed from a material obtained by adding a filler material such as a glass filler to a thermoplastic resin so that a linear expansion coefficient is reduced or a shape rigidity is enhanced (Japanese Patent Application Laid-Open No. 2008-142935 and Japanese Patent Application Laid-Open No. 2007-038673). In particular, in recent years, an opportunity to mail an ink cartridge into which a recording head is incorporated is increased, and there is a fear of an increase in external pressure. There is a demand for suppressing cracking and chipping of the ink storage portion even under such a usage environment.

Incidentally, a photograph image may be recorded on an entire surface of a recording medium by applying an ink to a region slightly wider than the recording medium. The ink jet recording apparatus for household use adopts, in order to adapt to the downsizing of the apparatus, a so-called serial-type recording head in which an image is recorded while scanning the recording head back and forth in a main scanning direction orthogonal to a conveying direction of the recording medium (sub-scanning direction). In a case of such a serial-type recording head, it is required to perform scanning in the main scanning direction until an ejection orifice array moves to an outer side with respect to the width of the recording medium. Accordingly, in the recording apparatus, it is required to provide a space corresponding to the width of the recording head for scanning the recording head in addition to the width of the recording medium. Thus, in order to further downsize the recording apparatus, it is required to reduce such a space, and it is considered that it is effective to reduce the width of the recording head in the main scanning direction.

The inventors of the present invention formed an ink storage portion whose width in the main scanning direction was reduced through use of a thermoplastic resin composition containing a filler material. Then, a recording unit was produced by bonding a recording head to the formed ink storage portion (hereinafter also simply referred to as "recording unit"), and an aqueous ink containing a dye was stored in the ink storage portion. As a result, it was found that the ink storage portion was liable to crack due to an external pressure such as an impact applied by falling. In addition, when color images were recorded with respective inks of cyan, yellow and magenta each stored in the ink storage portion formed from the thermoplastic resin composition containing the filler material, in some cases, bleeding was caused at a boundary portion between the colors.

SUMMARY OF THE INVENTION

Thus, the present invention has an object to solve problems caused when a recording apparatus having mounted thereon a recording unit in a form in which a recording head is incorporated into an ink storage portion formed from a thermoplastic resin composition containing a filler material is used and an aqueous ink containing a dye is used. That is, the present invention has an object to provide an ink jet recording method with which, even when such a downsized recording apparatus is used, while the strength of the recording head is maintained, a high-quality image in which bleeding is reduced can be recorded. Further, the present invention has another object to provide an ink jet recording apparatus to be used in this ink jet recording method.

That is, according to the present invention, there is provided an ink jet recording method using an ink jet recording apparatus, the ink jet recording apparatus including: an aqueous ink containing a dye; an ink storage portion which is configured to store the aqueous ink, and is formed from a thermoplastic resin composition containing a filler material; and a recording head to be bonded to the ink storage portion, the recording head having formed therein an ejection orifice configured to eject the aqueous ink supplied from the ink storage portion, the ink jet recording method including recording an image by applying the aqueous ink ejected from the ejection orifice to a recording medium. The ink storage portion includes three or more storage parts divided independently of each other by a partition portion arranged orthogonal to a longitudinal direction of the ink storage portion, and the three or more storage parts are arrayed in one predetermined direction. The aqueous ink includes a cyan ink, a magenta ink and a yellow ink. The ejection orifice array has three rows of ejection orifice arrays corresponding to the cyan ink, the magenta ink and the yellow ink, respectively, the three rows of ejection orifice arrays is formed in the recording head along the longitudinal direction of the ink storage portion. Among a dynamic surface tension $\gamma 10$ at a lifetime of 10 milliseconds of the cyan ink, the magenta ink and the yellow ink, an ink corresponding to the ejection orifice array arranged at a middle out of the three rows of ejection orifice arrays has a smallest dynamic surface tension $\gamma 10$ at a lifetime of 10 milliseconds.

According to the present invention, it is possible to solve problems caused when the recording apparatus having mounted thereon the recording unit in a form in which the recording head is incorporated into the ink storage portion formed from the thermoplastic resin composition containing the filler material is used and the aqueous ink containing the dye is used. That is, it is possible to provide an ink jet recording method with which, even when such a downsized recording apparatus is used, while the strength of a recording unit is maintained, a high-quality image in which bleeding is reduced can be recorded. Further, according to the present invention, it is possible to provide the ink jet recording apparatus to be used in this ink jet recording method.

Further features of the present invention will become apparent from the following description of exemplary embodiments with reference to the attached drawings.

DESCRIPTION OF THE EMBODIMENTS

Figure 1:
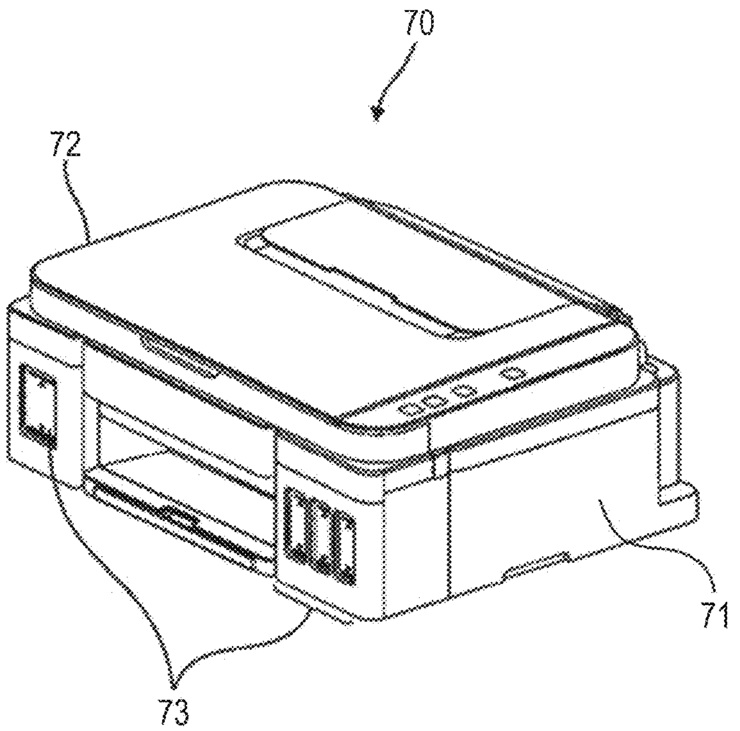
FIG. 1 is a perspective view for schematically illustrating an ink jet recording apparatus according to one embodiment of the present invention.

The present invention is described in more detail below by way of exemplary embodiments. In the present invention, when a compound is a salt, the salt is present as dissociated ions in an ink, but the expression “contain a salt” is used for convenience. In addition, an aqueous ink for ink jet is sometimes simply referred to as “ink”. Physical property values are values at normal temperature (25° C.) unless otherwise stated.

The inventors of the present invention produced an ink storage portion whose width in a main scanning direction was reduced through use of a thermoplastic resin composition containing a filler material. Then, a recording unit formed by bonding a recording head to the ink storage portion was prepared, and verification was made on causes of occurrence of cracking in the ink storage portion due to an external pressure such as an impact applied by falling.

In the ink storage portion, normally, a sponge-like ink absorber is stored, and also a filter is arranged on a lower side in a gravity direction. An ink that has passed through the filter flows out from an ink supply port provided at a lower portion of the ink storage portion to flow to an ejection orifice of the recording head. Further, the ink storage portion is divided into parts independently of each other by a partition portion for each kind of ink to be loaded. In some related-art ink storage portions, as illustrated in FIG. 7E, the ink storage portion has been divided by partition portions arranged into a T-shape so as to prevent a distance from the ink storage portion to the ejection orifice of the recording head (length of a flow path of the ink) from significantly varying depending on the kind of the ink. However, when the width of the ink storage portion is reduced in the main scanning direction, it is considered that the cracking is liable to be caused by the external pressure because there is only one contact portion between the partition portion arranged in parallel to a longitudinal direction of the ink storage portion (sub-scanning direction) and an outer peripheral wall of the ink storage portion.

As a result of the verification, the inventors of the present invention produced an ink storage portion which included three or more storage parts divided independently of each other by partition portions arranged orthogonal to the longitudinal direction of the ink storage portion and in which those storage parts were arrayed in one predetermined direction. Then, inks including a cyan ink, a magenta ink and a yellow ink were stored in the respective three or more storage parts. With such a configuration of the ink storage portion, all of the partition portions are brought into contact with the outer peripheral wall of the ink storage portion at two portions. Thus, it is considered that the strength is improved and cracking is less liable to be caused even by the external pressure.

As described above, when images were recorded with the respective inks of cyan, yellow and magenta each stored in the ink storage portion formed from the thermoplastic resin composition containing the filler material, in some cases, bleeding occurred at a boundary portion between the colors. It cannot be said that a gas barrier property of the ink storage portion formed from the thermoplastic resin composition containing the filler material is always high. Accordingly, a liquid component such as water in the ink stored in the ink storage portion is liable to gradually evaporate. In particular, in a case in which three or more storage parts are arrayed in one direction, as compared to the case in which the storage parts are arranged into a T-shape as described above, it is difficult to reduce variation of an amount of evaporation of the liquid component from each storage part. When the amount of evaporation of water that easily evaporates out of the liquid components varies, while an ink having a small amount of evaporation of water tends to maintain its surface tension as compared to that before evaporation, an ink having a large amount of evaporation of water is liable to be reduced in its surface tension as compared to that before evaporation. As a result, a range of fluctuation from the surface tension set depending on the ink composition is liable to vary among the inks, and it is considered that this variation caused the bleeding at the boundary portion between the colors.

As a result of verification made by the inventors of the present invention with respect to such problems, it has been found that an image with reduced bleeding can be recorded by adopting the following configuration. That is, three rows of ejection orifice arrays corresponding to the cyan ink, the magenta ink and the yellow ink, respectively, in which the plurality of ejection orifice arrays is arrayed in parallel to the longitudinal direction of the ink storage portion, are formed in the recording head. In addition, among a dynamic surface tension γ10 at a lifetime of 10 milliseconds of the cyan ink, the magenta ink and the yellow ink, an ink corresponding to the ejection orifice array arranged at the middle out of the three rows of ejection orifice arrays has the smallest dynamic surface tension γ10 (mN/m) at 25° C. and a lifetime of 10 milliseconds. An ink having a small value of dynamic surface tension at the lifetime of 10 milliseconds tends to quickly penetrate when being applied to the recording medium. When the value of the dynamic surface tension of the ink corresponding to the ejection orifice array arranged at the middle out of the three rows of ejection orifice arrays is set to be the smallest, the ink quickly penetrates into the recording medium even when being mixed with the inks ejected from the ejection orifices of the ejection orifice arrays arranged on both sides. Accordingly, the bleeding at the boundary portion can be more suppressed.

<Ink Jet Recording Method and Ink Jet Recording Apparatus>

The ink jet recording method of the present invention is a recording method using an ink jet recording apparatus including an ink containing a dye, an ink storage portion for storing the ink, and a recording head bonded to the ink storage portion. The ink storage portion is formed from a thermoplastic resin composition containing a filler material. In the recording head, an ejection orifice array for ejecting the ink supplied from the ink storage portion is formed. In addition, the ink jet recording method of the present invention includes a step of recording an image by applying the ink ejected from the ejection orifice to a recording medium. The ink storage portion includes three or more storage parts divided independently of each other by a partition portion arranged orthogonal to the longitudinal direction of the ink storage portion, and those storage parts are arrayed in one predetermined direction. In addition, the ink includes a cyan ink, a magenta ink and a yellow ink. Three rows of ejection orifice arrays corresponding to the cyan ink, the magenta ink and the yellow ink, respectively, are formed in the recording head along the longitudinal direction of the ink storage portion. Among a dynamic surface tension γ10 at a lifetime of 10 milliseconds of the cyan ink, the magenta ink and the yellow ink, the ink corresponding to the ejection orifice array arranged at the middle out of the three rows of ejection orifice arrays has the smallest dynamic surface tension γ10 at the lifetime of 10 milliseconds.

Further, the ink jet recording apparatus of the present invention is an ink jet recording apparatus including an ink containing a dye, an ink storage portion for storing the ink, and a recording head bonded to the ink storage portion. The ink storage portion is formed from a thermoplastic resin composition containing a filler material. In the recording head, an ejection orifice for ejecting the ink supplied from the ink storage portion is formed. The ink storage portion includes three or more storage parts divided independently of each other by a partition portion arranged orthogonal to the longitudinal direction of the ink storage portion, and those storage parts are arrayed in one predetermined direction. In addition, the ink includes a cyan ink, a magenta ink and a yellow ink. Three rows of ejection orifice arrays corresponding to the cyan ink, the magenta ink and the yellow ink, respectively, are formed in the recording head along the longitudinal direction of the ink storage portion. Among a dynamic surface tension γ10 at a lifetime of 10 milliseconds of the cyan ink, the magenta ink and the yellow ink, the ink corresponding to the ejection orifice array arranged at the middle out of the three rows of ejection orifice arrays has the smallest dynamic surface tension γ10 at the lifetime of 10 milliseconds.

(Ink Jet Recording Apparatus)

FIG. 1 is a perspective view for schematically illustrating an ink jet recording apparatus according to one embodiment of the present invention. As illustrated in FIG. 1, an ink jet recording apparatus 70 of this embodiment includes an outer package 71 and a cover member 72 arranged on the upper surface of the outer package 71. The cover member 72 is a member that is openable and closable in a vertical direction, and its opening in an upper direction enables the observation of the inside of the ink jet recording apparatus 70 having a rectangular parallelepiped shape.

Figure 2:
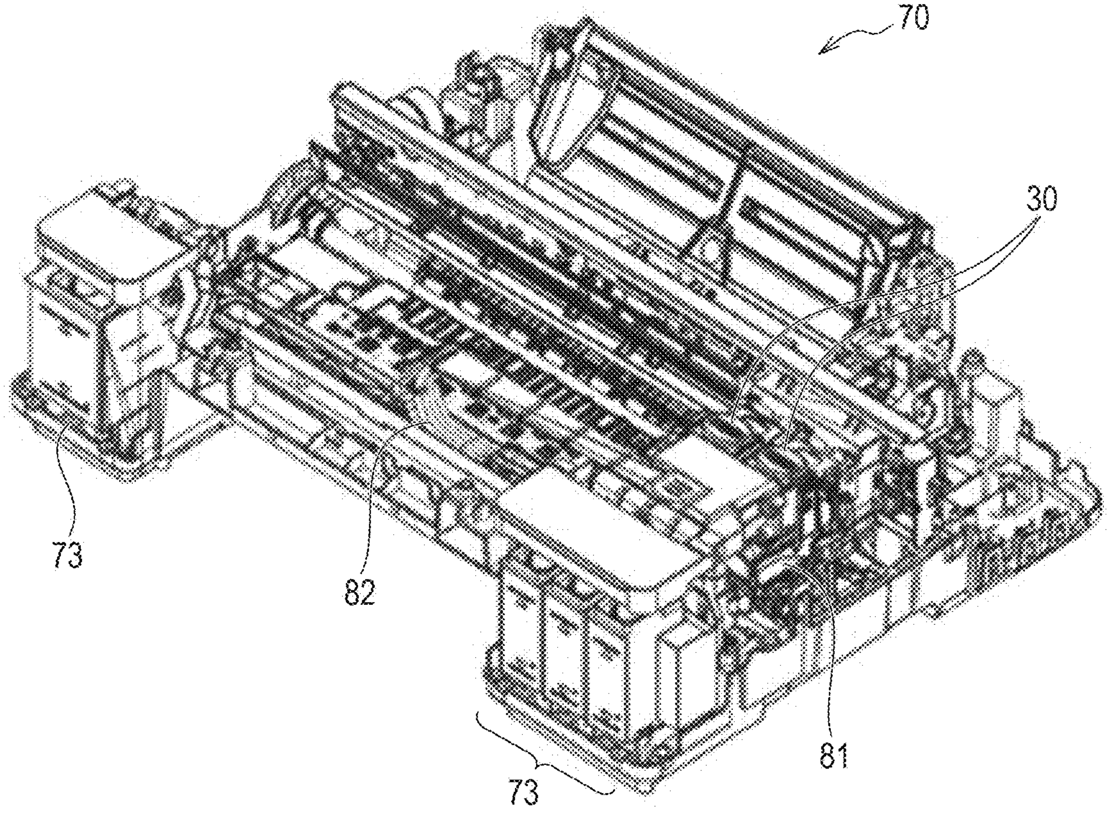
FIG. 2 is a perspective view for schematically illustrating an internal structure of the ink jet recording apparatus according to one embodiment of the present invention.

FIG. 2 is a perspective view for schematically illustrating the internal structure of the ink jet recording apparatus according to one embodiment of the present invention. A recording unit 30 in which a recording head and an ink storage portion are integrally formed is configured to be mountable to a carriage (support member) 81. The recording unit 30 is provided on the carriage by being coupled to a joint (not shown) provided at an upper portion of the carriage 81. The recording unit 30 is coupled to a tube 82 which is a flexible member, and another end of the tube 82 is coupled to a main tank (second ink storage portion) 73 which is a second ink storage portion. When the recording unit 30 is mounted to the carriage 81, a recording head 36 ((b) in FIG. 3) is allowed to communicate with the main tank 73 via the joint and the tube 82. The ink jet recording apparatus 70 of this embodiment is a recording apparatus of a serial scan type, and the carriage 81 is guided to be movable in a main scanning direction by a guide shaft. The carriage 81 reciprocates in the main scanning direction by a carriage motor and a drive force transmission mechanism such as a belt for transmitting a drive force of the carriage motor (both not shown).

A recording medium is conveyed by a conveyance roller in a sub-scanning direction orthogonal to the main scanning direction of the carriage 81. The ink jet recording apparatus 70 repeatedly performs a recording operation of ejecting an ink toward a recording region of the recording medium on a platen while moving the recording head 36 ((b) in FIG. 3) in the main scanning direction, and a conveying operation of conveying the recording medium in the sub-scanning direction by a distance corresponding to its recording width. In this manner, an image is sequentially recorded on the recording medium.

Figure 3:
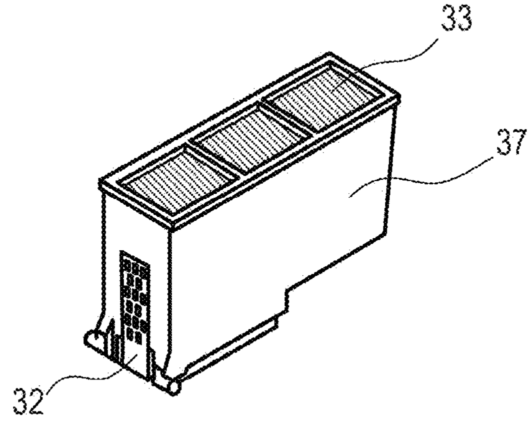
FIG. 3 is a view for schematically illustrating an example of a recording unit. (a) is a perspective view, and (b) is a perspective view of an exploded state.
Figure 3:
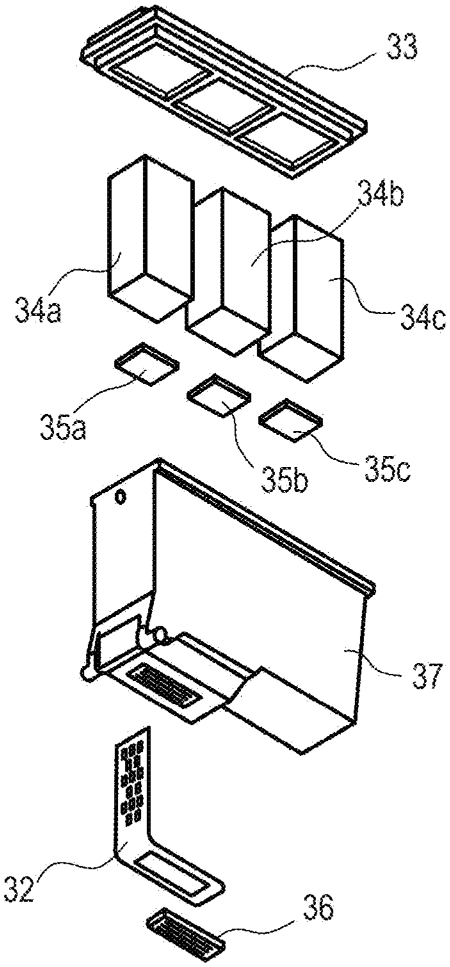

FIG. 3 is a view for schematically illustrating an example of the recording unit. (a) is a perspective view, and (b) is a perspective view of an exploded state. The recording unit illustrated in FIG. 3 includes an ink storage portion 37 and the recording head 36. The ink storage portion 37 is a casing formed from a thermoplastic resin composition containing a filler material. Examples of the thermoplastic resin composition include polyester, polycarbonate, polypropylene, polyethylene, polystyrene, polyphenylene ether and mixtures or modified substances of them. Examples of the filler material include a flake filler such as mica and a fibrous filler such as a glass fiber. A general glass fiber is a glass fiber (chopped strand) made of a material called E-glass (non-alkali glass) in a form of being cut into a predetermined length. The recording head 36 is preferably bonded to the ink storage portion 37 without through intermediation of any other member. The ink storage portion 37 has a light weight because the portion is a casing formed from a thermoplastic resin composition. The entirety of the recording unit is reduced in size and weight because the recording head 36 is bonded to the ink storage portion 37 without through intermediation of any other member such as a heat-radiating plate. The use of such recording unit can reduce the size and weight of the entirety of the ink jet recording apparatus. The heat-radiating plate may be, for example, a plate formed from a material such as a metal oxide such as alumina. Further, the ink storage portion 37 formed from the thermoplastic resin composition containing the filler material has a linear expansion coefficient lower than that of a member formed from a thermoplastic resin containing no filler material. Accordingly, deformation of the casing can be suppressed, and occurrence of cracking due to an external pressure such as falling can be suppressed.

The recording head 36 has arranged therein, for example, a plurality of ejection orifices that ejects the ink and an energy-generating element that generates energy for ejecting the ink. The energy-generating element and the like may be driven by, for example, electric power supplied through an electrical wiring member 32. The energy-generating element is an element that generates thermal energy or mechanical energy, and the action of the generated energy can eject the ink from the ejection orifices. Examples of the element that generates thermal energy include an electrothermal converter. Examples of the element that generates mechanical energy include a piezoelectric element. Of those, a recording head that ejects the ink by the action of the thermal energy is preferable because the recording head can be designed to be downsized.

The recording head 36 includes an ejection orifice surface in which a plurality of ejection orifice arrays each formed of a plurality of ejection orifices is arrayed in the same recording element substrate. When the plurality of ejection orifice arrays is arrayed in the same recording element substrate, a plurality of inks can be ejected by one recording unit, and thus the ink jet recording apparatus can be downsized. The plurality of ejection orifice arrays is preferably arrayed in a direction (sub-scanning direction) orthogonal to a reciprocating direction (main scanning direction) of the recording unit into which the recording head is incorporated. Further, with the ejection orifice array being formed of the plurality of ejection orifices, a recordable region at the time of reciprocating the recording head can be enlarged, and hence fast recording can be performed.

Sponge-like ink absorbers 34*a* to 34*c* are stored in the ink storage portion 37. In addition, filters 35*a* to 35*c* are arranged below the ink storage portion 37 in a gravity direction. When a negative pressure is generated by utilizing the capillary forces of the sponge-like ink absorbers 34*a* to 34*c*, the ink can be prevented from leaking from the ejection orifices. In addition, the arrangement of the filters 35*a* to 35*c* can suppress the entry of fine foreign matter such as dirt into the ejection orifices. Further, provision of a tank lid 33 by thermocompression bonding on an upper side of the ink storage portion 37 in the gravity direction can prevent the ink from leaking from the ink storage portion 37.

The recording head preferably includes a warming unit for warming the ink in the recording head. The warming unit only needs to be a unit that can warm the ink in the recording head to a temperature higher than a recording environment temperature such as a room temperature (25° C.). Examples of such warming unit may include: a heater for ink temperature control arranged so as to be brought into contact with the recording head; and a heater for ink ejection. To warm the ink with the heater for ink ejection, for example, such a current that the ink is not ejected can be repeatedly passed through the heater.

The ink jet recording apparatus further preferably includes a second ink storage portion and a tube. The second ink storage portion such as a main tank has a capacity larger than that of the ink storage portion (first ink storage portion) such as a sub tank. The tube allows the ink to flow between the second ink storage portion and the ink storage portion. In consideration of a usage mode or the like in remote work at home, reduction in replacement frequency of an ink cartridge is also important in addition to downsizing of the apparatus. Accordingly, further provision of the second ink storage portion such as the main tank can reduce the ink replacement frequency while the increase in size of the apparatus main body is avoided. In the following, an ink jet recording apparatus in which only the first ink storage portion such as the sub tank bonded to the recording head is provided as the ink storage portion is also referred to as "first apparatus configuration." In the case of the first apparatus configuration, when the ink stored inside of the ink storage portion has been consumed, the ink storage portion is replaced with another ink storage portion (ink storage portion filled with an ink). Thus, as compared to a second apparatus configuration, the main tank and the tube can be omitted, and thus the weight of the ink jet recording apparatus can be reduced. Further, an ink jet recording apparatus in which the second ink storage portion such as the main tank having a capacity larger than that of the sub tank is further provided as the ink storage portion is also referred to as "second apparatus configuration." In the case of the second apparatus configuration, for example, when a connection portion for a tube is formed in the tank lid 33 illustrated in FIG. 3, the ink storage portion 37 and the second ink storage portion such as the main tank can be connected to each other.

In the case of the second apparatus configuration, the ink replacement frequency is reduced as compared to the first apparatus configuration, and hence a period in which an ink in a stationary state is kept in the main tank becomes long. The degree of degradation in ejection property due to the sticking in the second apparatus configuration is liable to be larger than the degree of degradation in ejection property due to the sticking in the first apparatus configuration depending on the usage state. Moreover, when the inks have a difference in the degree of degradation in ejection property due to the sticking, this difference is increased. Accordingly, in general, the second apparatus configuration tends to have such a problem that a waste ink amount is further increased as compared to the first apparatus configuration. Meanwhile, in the ink jet recording method of the present invention, the waste ink amount can be reduced even in the case of the second apparatus configuration, and hence both of the reduction in ink replacement frequency and the reduction in waste ink amount can be achieved.

Figure 4:
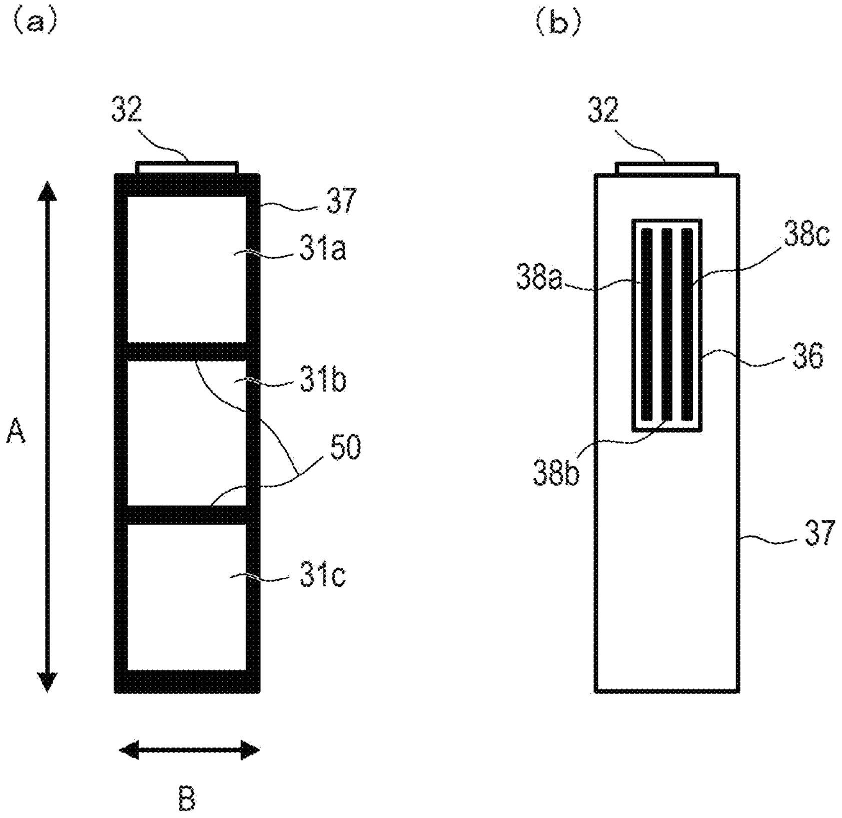
FIG. 4 is a view for schematically illustrating an example of the recording unit. (a) is a view as viewed from above with a tank lid being removed, and (b) is a view as viewed from below.

FIG. 4 is a view for schematically illustrating an example of the recording unit. (a) is a view as viewed from above with the tank lid being removed, and (b) is a view as viewed from below (recording head side). As illustrated in FIG. 4, the ink storage portion 37 includes three or more storage parts 31*a* to 31*c* divided independently of each other. Those storage parts 31*a* to 31*c* are divided by a partition portion 50 arranged orthogonal to the longitudinal direction of the ink storage portion 37 (sub-scanning direction) and thus can individually store the plurality of kinds of inks including the cyan ink, the magenta ink and the yellow ink. The partition portion 50 is formed from, for example, the same material as that of the casing. Further, the recording head 36 includes an ejection orifice surface in which a plurality of ejection orifice arrays 38*a* to 38*c* each formed of a plurality of ejection orifices is arrayed in the same recording element substrate. Those ejection orifice arrays 38*a* to 38*c* correspond to the respective plurality of kinds of inks stored individually in the storage parts 31*a* to 31*c*, and the storage parts 31*a* to 31*c* are arrayed in one predetermined direction. In addition, an ink having the largest content of the dye out of the cyan ink, the magenta ink and the yellow ink is preferably stored in the storage part 31*b* arranged on the inner side. The storage part 31*b* arranged on the inner side has a relatively small contact area with external air, and hence water is less liable to evaporate from the stored ink as compared to the storage parts 31*a* and 31*c* arranged on both sides. Moreover, water moves from each of the storage parts 31*a* and 31*c* arranged on both the sides to the storage part 31*b* arranged on the inner side, and the content of water in the ink stored in the storage part 31*b* is slightly increased (is humidified). In this manner, the occurrence of color unevenness is further suppressed, and it is considered that a further uniform image having a higher quality can be recorded.

Figure 5:
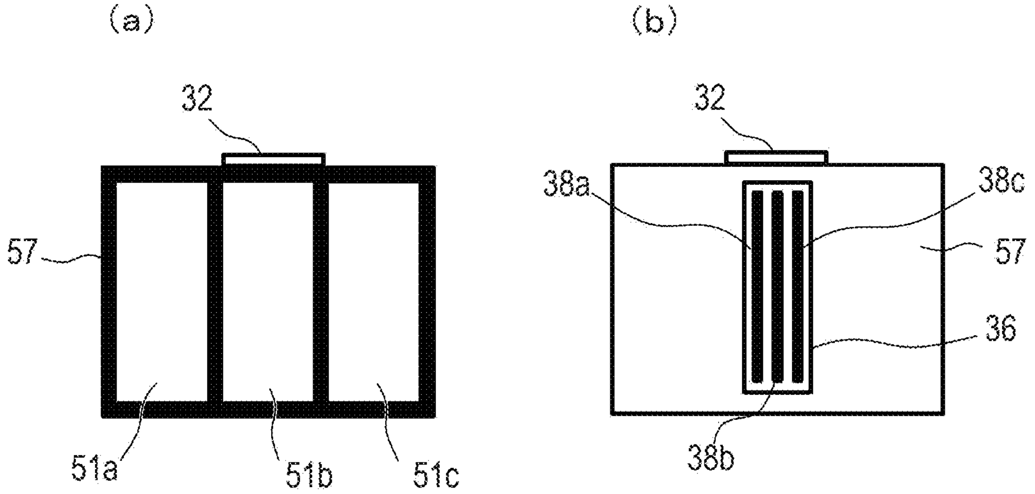
FIG. 5 is a view for schematically illustrating another example of the recording unit. (a) is a view as viewed from above with the tank lid being removed, and (b) is a view as viewed from below.

FIG. 5 is a view for schematically illustrating another example of the recording unit. (a) is a view as viewed from above with the tank lid being removed, and (b) is a view as viewed from below (recording head side). An ink storage portion 57 illustrated in FIG. 5 includes three or more storage parts 51*a* to 51*c* divided independently of each other, and those storage parts 51*a* to 51*c* are arrayed in one predetermined direction. An array direction of the plurality of storage parts only needs to be one direction in a predetermined direction. For example, the storage parts may be arrayed in a direction orthogonal to the main scanning direction of the recording head 36 as illustrated in FIG. 4, or may be arrayed in a direction parallel to the main scanning direction of the recording head 36 as illustrated in FIG. 5. From the viewpoint of the strength of the ink storage portion, the array direction of the plurality of storage parts is particularly preferably the array direction orthogonal to the main scanning direction of the recording head 36.

In the ink storage portion, a ratio (A/B) of a length A in a longitudinal direction (sub-scanning direction) to a length B in a transverse direction (main scanning direction) is preferably 2.0 times or more to 4.4 times or less, more preferably 2.0 times or more to 4.0 times or less ((a) in FIG. 4). When the ratio A/B is set to 2.0 times or more, a compact apparatus width can be achieved. In order to record an image on the entire surface of the recording medium through use of a so-called serial type ink jet recording apparatus in which the image is recorded while the recording head scans back and forth in the main scanning direction orthogonal to the conveying direction of the recording medium, it is required to move the ejection orifice array from one end to another end of the recording medium. When the width of the recording head is wide, the width of the ink jet recording apparatus becomes inevitably wide. Further, in a case in which the ratio A/B of the ink storage portion is excessively large, when an external force is applied to the casing, the stress concentrates in the longitudinal direction, and, in some cases, deformation due to the insufficient strength of the casing may occur. Accordingly, the ratio A/B is preferably 4.4 times or less, more preferably 4.0 times or less.

Figure 6:
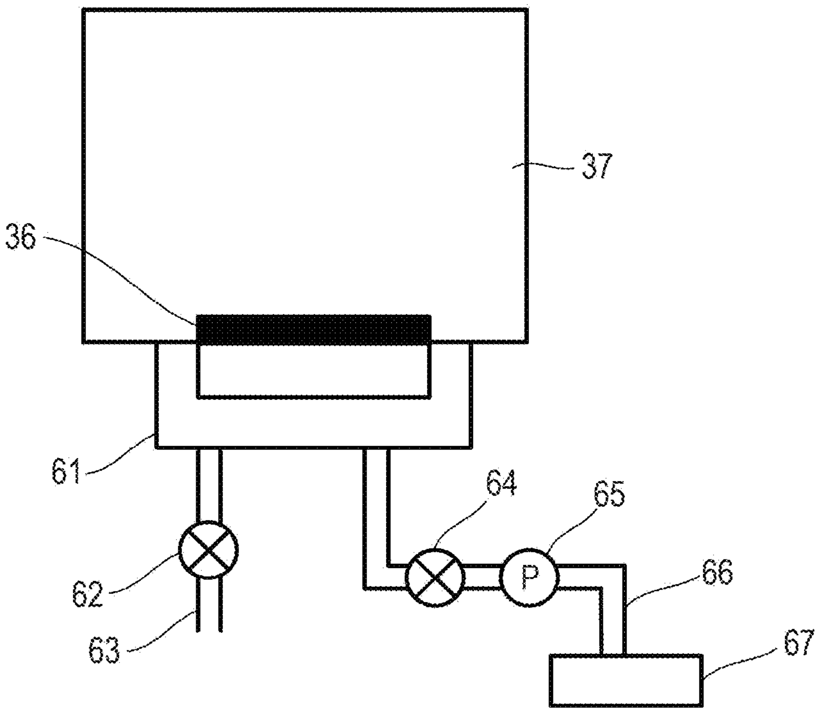
FIG. 6 is a schematic view for illustrating an example of a sucking unit.

FIG. 6 is a schematic view for illustrating an example of a sucking unit. As illustrated in FIG. 6, the ink jet recording apparatus includes a cap 61 for covering the plurality of ejection orifice arrays in abutment against a region including the ejection orifice surface of the recording head 36. A tube 63 and a waste ink tube 66 are connected to the cap 61. The tube 63 functions as an atmosphere communicating portion, and the waste ink tube 66 discharges a waste ink not used for recording, which is accumulated in the cap 61. In the middle of the tube 63, an atmosphere communicating valve 62 is provided. The waste ink discharged from the ejection orifice of the recording head 36 is stored in a waste ink storage portion 67. A suction valve 64 is provided in the middle of the waste ink tube 66, and a sucking operation for discharging the unrequired waste ink is carried out through use of a pump 65. In this embodiment, description has been given of an example of a sucking operation in which the pump provided on a downstream side of the recording head is used, but the waste ink not used for recording may be discharged from the ejection orifice by a pressurizing operation using a pump provided on an upstream side of the recording head.

For example, when it becomes difficult to normally eject an ink because the ink dries and sticks in a flow path or the like communicating with the ejection orifice, the sucking operation is carried out to cause a new ink to flow from the ink storage portion 37. Thus, the state in which the normal ejection is difficult can be solved. Normally, when the plurality of ejection orifice arrays is arrayed in the same recording element substrate, the sucking operation is carried out with the same cap. For example, when the ejection orifice arrays for respectively ejecting a cyan ink, a magenta ink and a yellow ink are arrayed in the same recording element substrate, those inks are collectively sucked with the same cap. In general, when an ink for which sticking can be easily solved and an ink for which sticking cannot be easily solved are mixed, although the sticking of the ejection orifice for ejecting the ink for which sticking can be easily solved is solved, the sucking operation for the ink for which sticking cannot be easily solved needs to be continued, and thus the waste ink amount is increased.

(Aqueous Ink)

In the ink jet recording method of the present invention, an ink containing a dye is used. The method includes a step of recording an image by applying the ink ejected from an ejection orifice to a recording medium. From the viewpoint of color developability and a color gamut, the ink includes a cyan ink, a magenta ink and a yellow ink. Now, components for forming the ink and the like are described. When there is no need to distinguish the cyan ink, the magenta ink and the yellow ink from each other, the inks are collectively referred to as "ink." The inks of the respective colors may have the same configuration or have different configurations within a range of the preferable mode described below.

[Coloring Material]

A dye is used as a coloring material of the ink. As compared to a pigment contained in an aqueous medium in a dispersed state, when a dye dissolved in the aqueous medium in a molecular level is used as the coloring material, an image excellent in glossiness can be recorded with a special paper for ink jet such as a glossy paper. Thus, through use of the ink containing the dye, an image having a higher quality can be recorded. The ink preferably contains no pigment as the coloring material.

Examples of the dye include a direct dye, an acid dye, a basic dye, a dispersive dye and a food dye. Of those, a dye including an anionic group is preferably used. Specific examples of a dye skeleton include an azo skeleton, a triphenylmethane skeleton, a phthalocyanine skeleton, an azaphthalocyanine skeleton, a xanthene skeleton and an anthrapyridone skeleton. A dye having a C.I. number is also preferably used. Examples of this dye include: C.I. Food Black 2; C.I. Direct Black 195; C.I. Direct Yellow: 86, 132, 173; C.I. Acid Yellow: 17, 23; C.I. Acid Red: 52, 249, 289; C.I. Acid Blue 9; and C.I. Direct Blue: 86, 199.

The content (% by mass) of the dye in the ink is preferably 0.10% by mass or more to 15.00% by mass or less, more preferably 0.50% by mass or more to 10.00% by mass or less with respect to the total mass of the ink.

[Aqueous Medium]

The ink is an aqueous ink containing an aqueous medium that is a mixed solvent of water and a water-soluble organic solvent. Deionized water (ion-exchanged water) is preferably used as the water. The content (% by mass) of the water in the ink is preferably 50.00% by mass or more to 95.00% by mass or less with respect to the total mass of the ink. Solvents that may be used in inks for ink jet, such as alcohols, glycols, (poly)alkylene glycols, nitrogen-containing compounds and sulfur-containing compounds, may each be used as the water-soluble organic solvent. The content (% by mass) of the water-soluble organic solvent in the ink is preferably 3.00% by mass or more to 50.00% by mass or less with respect to the total mass of the ink.

[Surfactant]

The ink preferably further contains a surfactant. Examples of the surfactant may include an anionic surfactant, a cationic surfactant, a nonionic surfactant, an amphoteric surfactant and other surfactants. Of those, a nonionic surfactant is preferably used.

Examples of the anionic surfactant may include a polyoxyethylene alkylether sulfuric acid ester salt, a polyoxyethylene alkylether sulfonic acid salt, a polyoxyethylene alkyl phenyl ether sulfuric acid ester salt, a polyoxyethylene alkyl phenyl ether sulfonic acid salt, an alpha-sulfo fatty acid ester salt, an alkylbenzene sulfonic acid salt, an alkylphenol sulfonic acid salt, an alkylnaphthalene sulfonic acid salt, an alkyltetralin sulfonic acid salt and a dialkyl sulfosuccinic acid salt. Examples of the cationic surfactant may include an alkyltrimethylammonium salt and a dialkyldimethylammonium chloride.

Examples of the nonionic surfactant include an acetylene glycol-based surfactant, a polyoxyethylene alkylether, a polyoxyethylene fatty acid ester, a polyoxyethylene alkyl phenyl ether, a fatty acid diethanol amide and a polyoxyethylene-polyoxypropylene block copolymer. An example of the amphoteric surfactant is an alkyl carboxybetaine. Examples of the other surfactant may include a fluorine-based surfactant and a silicone-based surfactant.

The ink preferably contains an acetylene glycol-based surfactant. The acetylene glycol-based surfactant is suitable because the balance between the additive amount to the ink and the ability to reduce the surface tension is good. Thus, through use of the ink containing the acetylene glycol-based surfactant, an image having a higher quality can be recorded.

The content (% by mass) of the surfactant in the ink is preferably 0.10% by mass or more to 5.00% by mass or less, more preferably 0.10% by mass or more to 2.00% by mass or less with respect to the total mass of the ink.

[Other Components]

Besides the above-mentioned components, as required, the ink may also contain various additives, such as an antifoam agent, a pH adjuster, a viscosity adjuster, a rust preventive, a preservative, a fungicide, an antioxidant and a reduction inhibitor.

[Physical Properties of Ink]

[Viscosity]

A viscosity of the ink at 25° C. is preferably 1.0 mPa·s or more to 5.0 mPa·s or less, more preferably 1.0 mPa·s or more to 3.0 mPa·s or less. Further, a difference ($\eta 1-\eta 2$) between the largest viscosity $\eta 1$ (mPa·s) and the smallest viscosity $\eta 2$ (mPa·s) out of the viscosities of the cyan ink, the magenta ink and the yellow ink is preferably 0.2 mPa·s or less. When "$\eta 1-\eta 2$" is 0.2 mPa·s or less, the inks of the three colors are uniformly ejected, and hence the uniformity of the image can be further improved. The viscosity of the ink can be adjusted as appropriate by setting, for example, a kind or an amount of a water-soluble organic solvent or a surfactant.

[Static Surface Tension]

A static surface tension of the ink at 25° C. is preferably 28.0 mN/m or more to 45.0 mN/m or less. Further, a horizontal part within an ink flow path through which an ink flows between the ink storage portion and the ejection orifice, which corresponds to an ink having the smallest static surface tension (mN/m) out of the cyan ink, the magenta ink and the yellow ink, preferably has the largest length. Mixture of bubbles into the ink passing through the ink flow path is liable to affect the ejection. In addition, as the ink flow path from the ink storage portion to the ejection orifice becomes longer, more bubbles are liable to be mixed. When the static surface tension of the ink flowing through the ink flow path having the largest length of the horizontal part is set to be the smallest, wettability of this ink to the ink flow path is increased to make bubbles less liable to be generated. Thus, the generation amount of the bubbles may easily become equivalent to those of the other two colors. In this manner, the inks of the three colors can be ejected more uniformly, and the uniformity of the recorded image can be more improved.

Out of the static surface tensions of the cyan ink, the magenta ink and the yellow ink, the static surface tension of the ink having the smallest lightness is represented by "$\gamma s1$ (mN/m)," and the static surface tension of the ink having the largest lightness is represented by "$\gamma s2$ (mN/m)." In this case, a difference ($\gamma s1-\gamma s2$) between "the static surface tension $\gamma s1$ (mN/m) of the ink having the smallest lightness" and "the static surface tension $\gamma s2$ (mN/m) of the ink having the largest lightness" is preferably 0.0 mN/m or more to 2.0 mN/m or less. When a plurality of inks having different color phases is applied adjacent to each other on the recording medium, the inks may be partially mixed at the boundary portion and the boundary portion may bleed, resulting in reduction in quality of the image. In particular, when two kinds of inks having a large lightness difference are applied adjacent to each other on the recording medium, the bleeding at the boundary portion becomes easily noticeable. In addition, at the boundary portion, the ink having a high static surface tension tends to draw in the ink having a low static surface tension. Accordingly, with "$\gamma s1-\gamma s2$" being set within the above-mentioned range, an image having less bleeding and a higher quality can be recorded.

[Dynamic Surface Tension]

As described above, in the ink jet recording apparatus of this embodiment, the three rows of ejection orifice arrays corresponding to the cyan ink, the magenta ink and the yellow ink, respectively, in which the plurality of ejection orifices is arrayed in parallel to the longitudinal direction of the ink storage portion are formed in the recording head. In addition, the ink corresponding to the ejection orifice array arranged at the middle out of the three rows of ejection orifice arrays has the smallest dynamic surface tension γ10 (mN/m) at 25° C. and a lifetime of 10 milliseconds. An ink having a small value of dynamic surface tension at the lifetime of 10 milliseconds tends to quickly penetrate when being applied to the recording medium. When the value of the dynamic surface tension of the ink corresponding to the ejection orifice array arranged at the middle out of the three rows of ejection orifice arrays is set to be the smallest, the ink quickly penetrates into the recording medium even when being mixed with the inks ejected from the ejection orifices of the ejection orifice arrays arranged on both sides. Accordingly, the bleeding at the boundary portion can be more suppressed. The dynamic surface tension of the ink at 25° C. is preferably 35.0 mN/m or more to 55.0 mN/m or less.

The static surface tension of the ink can be measured by a Wilhelmy method (plate method). The static surface tension of the ink can be adjusted as appropriate by setting, for example, a kind or an amount of a water-soluble organic solvent or a surfactant. Further, the dynamic surface tension of the ink can be measured by a maximum bubble pressure method. The dynamic surface tension of the ink can be adjusted as appropriate by setting, for example, a kind or an amount of a water-soluble organic solvent.

[Lightness]

As described above, when the three rows of ejection orifice arrays corresponding to the cyan ink, the magenta ink and the yellow ink, respectively, are formed in the recording head, the three rows of ejection orifice arrays are preferably arranged in the order of the lightness of the corresponding ink. The image is recorded as follows: with respect to the ink ejected from the ejection orifice of the ejection orifice array arranged at the middle, the inks ejected from the ejection orifices of the ejection orifice arrays on both the sides are applied to the recording medium so as to bridge the difference of the lightness. In this manner, even when the bleeding occurs, the difference in lightness is reduced and becomes less noticeable, and thus an image having a higher quality can be recorded.

The lightness of the ink is L* in the L*a*b* display system defined by the International Commission on Illumination (CIE). The lightness can be measured through use of a spectrophotometer with a sample of an ink diluted to an appropriate degree of dilution with water to have a value of absorbance suitable for measurement. In some cases, the lightness of the ink varies depending on the content of the coloring material in the ink. Accordingly, when the lightnesses of the plurality of inks are compared to each other, the plurality of inks may be diluted to the same degree of dilution. The lightness of the ink can be adjusted as appropriate by setting, for example, a kind or an amount of the dye.

[pH]

The pH of the ink at 25° C. is preferably 5.0 or more to 9.5 or less. The pH of the ink can be adjusted as appropriate by a pH adjustor or the like. The pH of the ink tends to be affected by a counter-ion of an ionic group of a water-soluble dye.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Preparation of Aqueous Solution of Dye>

C.I. Direct Blue 199, C.I. Acid Blue 9, C.I. Acid Red 249, C.I. Direct Yellow 132, Compound 1, Compound 2 and Compound 3 were prepared as dyes. Each of the prepared dyes was dissolved in pure water to prepare an aqueous solution of each dye having the content of the dye of 10.00%. Details of Compound 1, Compound 2 and Compound 3 are shown below.

(Compound 1)

A sodium salt of a compound expressed by the following formula (1) (Compound 1) was obtained as a free acid form in conformity to the description of Japanese Patent Application Laid-Open No. H10-306221.

(1)

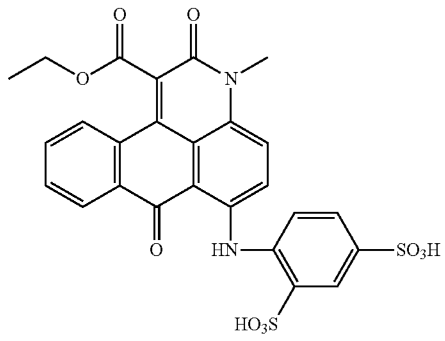

(Compound 2)

A sodium salt of a compound expressed by the following formula (2) (Compound 2) was obtained as a free acid form in conformity to the description of Japanese Patent Application Laid-Open No. 2006-143989.

(2)

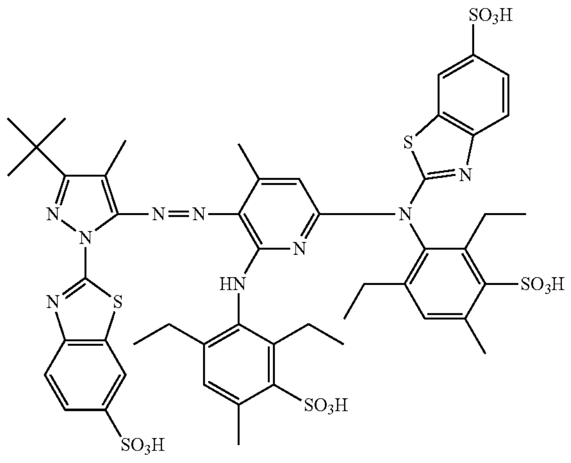

(Compound 3)

A potassium salt of a compound expressed by the following formula (3) (Compound 3) was obtained as a free acid form in conformity to the description of Japanese Patent Application Laid-Open No. 2012-149212.

(3)

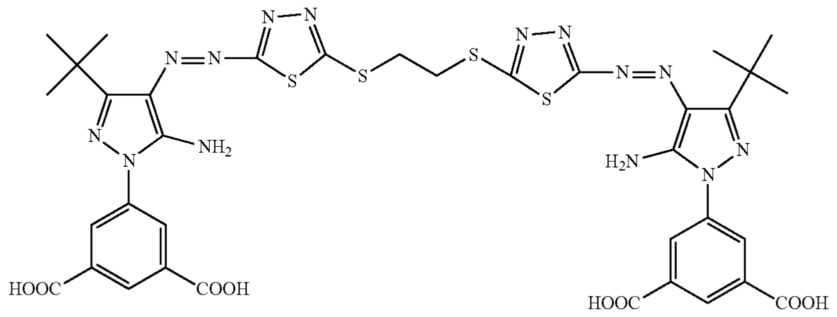

<Preparation of Ink>

(Inks C1 to C9, M1 to M4 and Y1 to Y3)

Components (unit: %) shown in the upper section of Table 1 (Table 1-1 to Table 1-3) were mixed and sufficiently stirred. After that, the mixtures were filtered with a filter having a pore size of 0.20 μm under pressure to prepare respective inks. In Table 1, the terms "ACETYLENOL E100" and "ACETYLENOL E60" are both the product names of acetylene glycol-based nonionic surfactants (manufactured by Kawaken Fine Chemicals Co., Ltd.).

The characteristics of the respective inks are shown in the lower section of Table 1. The viscosity of each of the inks was measured under the temperature condition of 25° C. through use of a rotary viscometer (product name "RE80-type Viscometer," manufactured by Toki Sangyo Co., Ltd). The static surface tension γs of the ink was measured under the temperature condition of 25° C. through use of an automatic surface tensiometer (product name "DY-300," manufactured by Kyowa Interface Science Co., Ltd). The dynamic surface tension γ10 at the lifetime of 10 milliseconds of the ink was measured under the temperature condition of 25° C. through use of a dynamic surface tensiometer (product name "Bubble Pressure Tensiometer BP-2," manufactured by KRUSS) using a maximum bubble pressure method. The lightness of the ink was measured by diluting the ink with 2,000 times the amount of pure water and then using an ultraviolet and visible spectrophotometer (product name "U-3900H," manufactured by Hitachi, Ltd.) under conditions of a light source of C and a visual field of 2°. The lightness of the ink is the lightness L* that is based on the L*a*b* display system defined by the International Commission on Illumination (CIE).

TABLE 1-1

| Composition and characteristics of ink | Ink | | | | |
|---|---|---|---|---|---|
| | C1 | C2 | C3 | C4 | C5 |
| Aqueous solution of C.I. Direct Blue 199 | 50.00 | | 50.00 | 50.00 | 50.00 |
| Aqueous solution of C.I. Acid Blue 9 | | 50.00 | | | |
| Aqueous solution of Compound 1 | | | | | |
| Aqueous solution of C.I. Acid Red 249 | | | | | |
| Aqueous solution of Compound 2 | | | | | |
| Aqueous solution of C.I. Direct Yellow 132 | | | | | |
| Aqueous solution of Compound 3 | | | | | |
| Glycerin | 12.00 | 12.00 | 12.00 | 12.00 | 12.00 |
| Triethylene glycol | 5.50 | 5.50 | 4.50 | 3.50 | 6.00 |
| 3-Methyl-1,5-pentanediol | 7.50 | 7.50 | 7.50 | 7.50 | 6.30 |

TABLE 1-1-continued

| Composition and characteristics of ink | Ink | | | | |
|---|---|---|---|---|---|
| | C1 | C2 | C3 | C4 | C5 |
| ACETYLENOL E100 | 0.50 | 0.50 | 0.50 | 0.50 | 0.50 |
| ACETYLENOL E60 | | | | | |
| Pure water | 24.50 | 24.50 | 25.50 | 26.50 | 25.20 |
| Content (%) of dye | 5.00 | 5.00 | 5.00 | 5.00 | 5.00 |
| Viscosity (mPa · s) | 2.2 | 2.2 | 2.1 | 2.0 | 2.2 |
| Static surface tension (mN/m) | 36.0 | 36.0 | 36.0 | 36.0 | 37.1 |
| Dynamic surface tension (mN/m) | 43.0 | 43.0 | 43.0 | 43.0 | 43.0 |
| Lightness | 72 | 76 | 72 | 72 | 72 |

TABLE 1-2

| Composition and characteristics of ink | Ink | | | | |
|---|---|---|---|---|---|
| | C6 | C7 | C8 | C9 | M1 |
| Aqueous solution of C.I. Direct Blue 199 | 50.00 | 40.00 | 40.00 | 50.00 | |
| Aqueous solution of C.I. Acid Blue 9 | | | | | |
| Aqueous solution of Compound 1 | | | | | 40.00 |
| Aqueous solution of C.I. Acid Red 249 | | | | | |
| Aqueous solution of Compound 2 | | | | | |
| Aqueous solution of C.I. Direct Yellow 132 | | | | | |
| Aqueous solution of Compound 3 | | | | | |
| Glycerin | 12.00 | 12.00 | 12.00 | 12.00 | 12.00 |
| Triethylene glycol | 5.80 | 3.30 | 3.00 | 5.50 | 6.00 |
| 3-Methyl-1,5-pentanediol | 6.50 | 8.50 | 8.80 | 7.00 | 8.00 |
| ACETYLENOL E100 | 0.50 | 0.50 | 0.50 | | |
| ACETYLENOL E60 | | | | 0.25 | 0.20 |
| Pure water | 25.20 | 35.70 | 35.70 | 25.25 | 33.80 |
| Content (%) of dye | 5.00 | 4.00 | 4.00 | 5.00 | 4.00 |
| Viscosity (mPa · s) | 2.2 | 2.2 | 2.2 | 2.2 | 2.3 |
| Static surface tension (mN/m) | 37.0 | 35.0 | 34.9 | 36.0 | 35.5 |
| Dynamic surface tension (mN/m) | 43.0 | 43.0 | 43.0 | 39.0 | 39.5 |
| Lightness | 72 | 74 | 74 | 72 | 82 |

TABLE 1-3

| Composition and characteristics of ink | Ink | | | | | |
|---|---|---|---|---|---|---|
| | M2 | M3 | M4 | Y1 | Y2 | Y3 |
| Aqueous solution of C.I. Direct Blue 199 | | | | | | |
| Aqueous solution of C.I. Acid Blue 9 | | | | | | |
| Aqueous solution of Compound 1 | | | 50.00 | | | |
| Aqueous solution of C.I. Acid Red 249 | 40.00 | | | | | |
| Aqueous solution of Compound 2 | | 40.00 | | | | |
| Aqueous solution of C.I. Direct Yellow 132 | | | | 40.00 | | 40.00 |
| Aqueous solution of Compound 3 | | | | | 40.00 | |
| Glycerin | 12.00 | 12.00 | 12.00 | 12.00 | 12.00 | 12.00 |
| Triethylene glycol | 6.00 | 6.00 | 5.00 | 6.00 | 6.00 | 6.20 |
| 3-Methyl-1,5-pentanediol | 8.00 | 8.00 | 8.20 | 8.00 | 8.00 | 7.80 |
| ACETYLENOL E100 | | | | 0.50 | 0.50 | |
| ACETYLENOL E60 | 0.20 | 0.20 | 0.22 | | | 0.25 |
| Pure water | 33.80 | 33.80 | 24.58 | 33.50 | 33.50 | 33.75 |
| Content (%) of dye | 4.00 | 4.00 | 5.00 | 4.00 | 4.00 | 4.00 |
| Viscosity (mPa · s) | 2.3 | 2.3 | 2.3 | 2.3 | 2.3 | 2.2 |
| Static surface tension (mN/m) | 35.5 | 35.5 | 35.5 | 35.0 | 35.0 | 35.0 |
| Dynamic surface tension (mN/m) | 39.5 | 39.5 | 39.5 | 41.0 | 41.0 | 39.0 |
| Lightness | 85 | 83 | 80 | 95 | 93 | 95 |

(Inks C10, M5 and Y4)

In conformity to the description of Japanese Patent Application Laid-Open No. 2007-038673, components (unit: %) shown in the upper section of Table 2 were mixed and sufficiently stirred. After that, the mixtures were filtered with a filter having a pore size of 0.20 μm under pressure to prepare respective inks. The respective inks of Table 2 correspond to the inks C1, M1 and Y1 described in Japanese Patent Application Laid-Open No. 2007-038673. In Table 2, the term "ACETYLENOL E100" is the product name of an acetylene glycol-based nonionic surfactant (manufactured by Kawaken Fine Chemicals Co., Ltd.). The lower section of Table 2 shows the characteristics of the respective inks. The measurement conditions are similar to those of the inks described in Table 1.

TABLE 2

| Composition and characteristics of ink | Ink | | |
|---|---|---|---|
| | C10 | M5 | Y4 |
| Cyan dye 1 | 6.00 | | |
| Magenta dye 1 | | 6.00 | |
| C.I. Direct Yellow 132 | | | 3.00 |
| Glycerin | 5.00 | 4.00 | 8.00 |
| Ethylene glycol | 7.00 | 8.00 | 8.00 |
| 2-Pyrrolidone | 4.00 | 5.00 | 4.00 |
| 1,5-Pentanediol | 5.00 | 5.00 | |
| Ethylene urea | 5.00 | 5.10 | 5.00 |
| ACETYLENOL E100 | 0.80 | 0.80 | 0.80 |
| Pure water | 67.20 | 66.10 | 71.20 |
| Content (%) of dye | 6.00 | 6.00 | 1.90 |
| Viscosity (mPa · s) | 2.9 | 2.4 | 1.9 |
| Static surface tension (mN/m) | 32.6 | 34.1 | 34.2 |
| Dynamic surface tension (mN/m) | 39.5 | 38.7 | 37.7 |
| Lightness | 70 | 79 | 97 |

<Configuration of Recording Unit>

A recording head employing a system of ejecting an ink by applying thermal energy was prepared. In the recording element substrate forming the recording head, an ejection orifice array formed of 384 ejection orifices arrayed at an array density of 600 dpi is arranged. The mass of an ink droplet ejected from one ejection orifice is 4.5 ng. Further, a thermoplastic resin composition was respectively molded to provide recording units 1 to 13 having ink storage portions arranged in the manner illustrated in FIG. 7A to FIG. 7E. As the thermoplastic resin composition, there was used a thermoplastic resin composition obtained by adding, as the filler material, 25 parts of E-glass chopped strand having a length of 5 mm to 100 parts of a thermoplastic resin being a mixture of a styrene-based resin and polyphenylene ether. The ink flow path through which the ink flowed between the ink storage portion and the ejection orifice was formed so that the characteristics of the ink storage portions "a" to "c" illustrated in FIG. 7A to FIG. 7E and the positions of the ink storage portions corresponding to the respective ejection orifice arrays (observer's left side, middle, observer's right side) had the relationships shown in Table 3.

Figure 7A:
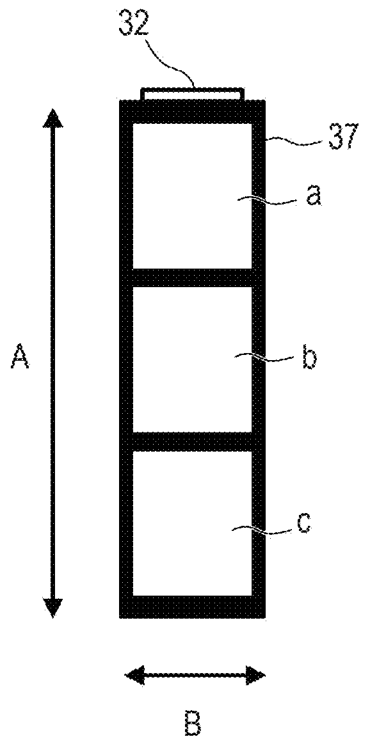
FIG. 7A is a schematic view for illustrating an example of an array mode of storage parts.

In the ink storage portion 37 illustrated in FIG. 7A, three storage parts "a" to "c" are arrayed in a direction orthogonal to a scanning direction of the recording head. In an ink storage portion 77 illustrated in FIG. 7B, three storage parts "a" to "c" are arrayed in a direction orthogonal to a scanning direction of the recording head. In an ink storage portion 87 illustrated in FIG. 7C, three storage parts "a" to "c" are arrayed in a direction orthogonal to a scanning direction of the recording head. In an ink storage portion 107 illustrated in FIG. 7D, three storage parts "a" to "c" are arrayed in a direction parallel to the scanning direction of the recording head. In an ink storage portion 117 illustrated in FIG. 7E, three storage parts "a" to "c" are arranged in a T-shape instead of being arranged in one direction. Ink storage portions 9, 10 and 12 shown in Table 3 were obtained by molding a thermoplastic resin that is a mixture of a styrene-based resin and polyphenylene ether, that is, a thermoplastic resin having no filler material added thereto. The recording head was bonded to the obtained ink storage portion without intermediation of any other member to manufacture the recording unit.

TABLE 3

Figure 7B:
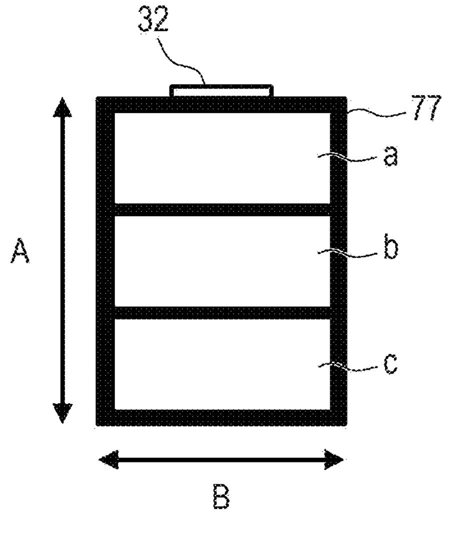
FIG. 7B is a schematic view for illustrating another example of the array mode of the storage parts.
Figure 7C:
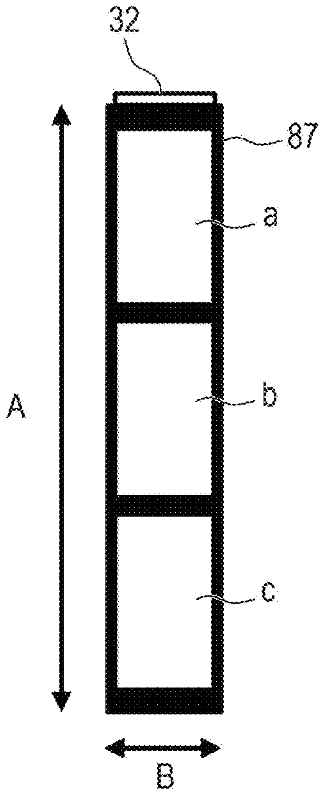
FIG. 7C is a schematic view for illustrating another example of the array mode of the storage parts.
Figure 7D:
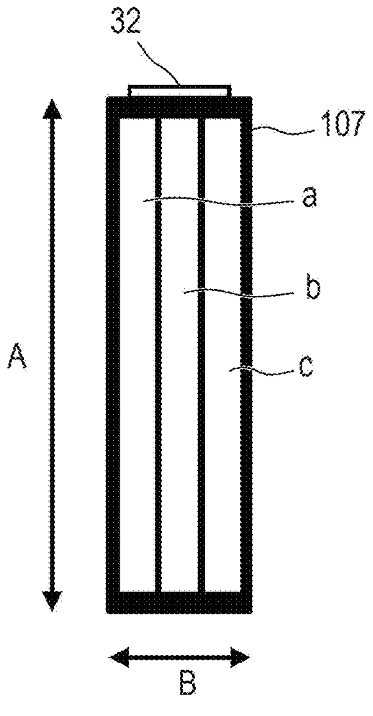
FIG. 7D is a schematic view for illustrating another example of the array mode of the storage parts.
Figure 7E:
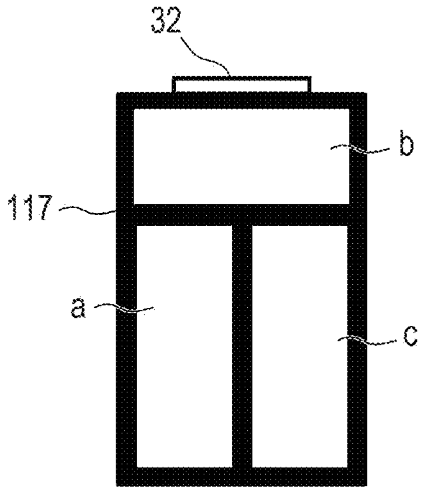
FIG. 7E is a schematic view for illustrating another example of the array mode of the storage parts.

| Characteristics of recording unit | | | | | | |
|---|---|---|---|---|---|---|
| | | | | Position of ink storage portion corresponding to ejection orifice array | | |
| | Characteristics of ink storage portion | | | Ejection orifice array | Ejection | Ejection orifice array |
| Recording unit | Filler material | Shape | A/B ratio | on observer's left side | orifice array at middle | on observer's right side |
| 1 | Present | FIG. 7A | 3.0 | c | a | b |
| 2 | Present | FIG. 7A | 3.0 | a | c | b |
| 3 | Present | FIG. 7A | 3.0 | c | b | a |
| 4 | Present | FIG. 7A | 3.0 | a | b | c |
| 5 | Present | FIG. 7B | 1.9 | c | a | b |
| 6 | Present | FIG. 7B | 2.0 | c | a | b |
| 7 | Present | FIG. 7C | 4.4 | c | a | b |
| 8 | Present | FIG. 7C | 4.7 | c | a | b |
| 9 | Absent | FIG. 7A | 3.0 | c | a | b |
| 10 | Absent | FIG. 7D | 3.0 | a | b | c |
| 11 | Present | FIG. 7D | 3.0 | a | b | c |
| 12 | Absent | FIG. 7E | 1.9 | a | b | c |
| 13 | Present | FIG. 7E | 1.9 | a | b | c |

<Evaluation>

(Ink Jet Recording Apparatus)

A product name "PIXUS TS5130S" (manufactured by Canon Inc.) was prepared as an apparatus 1 as an ink jet recording apparatus of a type in which, when an ink stored inside of the ink storage portion (ink cartridge) has been consumed, the ink storage portion is replaced with a new ink storage portion filled with the ink. Further, a product name "G3370" (manufactured by Canon Inc.) was prepared as an apparatus 2 as an ink jet recording apparatus of a type in which an ink storage portion (sub tank) on a carriage and an ink storage portion (main tank) placed in the apparatus are connected to each other by a tube through which the ink flows. Those apparatus were modified to allow the prepared recording unit described above to be mounted thereon. In this Example, the recording duty of a solid image recorded under the following condition is defined as 100%: two ink droplets having a mass per droplet of 4.5 ng are applied to a unit region measuring 1/600 inch by 1/600 inch. In the present invention, in evaluation criteria for each of the following items, while levels "A" and "B" were defined as acceptable levels, a level "C" was defined as an unacceptable level. The evaluation results are shown in Table 4 (Table 4-1 to Table 4-3). In Table 4, symbols ("a" to "c") indicating the positions of the inks of the respective colors correspond to symbols ("a" to "c") in FIG. 7A to FIG. 7E.

(Strength of Ink Storage Portion)

In order to promote deformation by the heat of the ink storage portion (casing), the recording unit was stored for 1 month and 2 months under an environment at a temperature of 60° C. Under a state in which the upper surface of the ink storage portion was directed downward in the gravity direction and the ejection orifice surface of the recording head was directed upward, the recording unit was dropped twice on a lauan material from a height of 80 cm. The ink storage portion of the recording unit after dropping was visually observed, and the strength of the ink storage portion was evaluated in accordance with the evaluation criteria shown below.

A: No cracking or chipping occurred in the ink storage portion even when the ink storage portion was stored for 2 months at 60° C.

B: No cracking or chipping occurred in the ink storage portion even when the ink storage portion was stored for 1 month at 60° C., but cracking or chipping occurred in the ink storage portion when the ink storage portion was stored for 2 months at 60° C.

C: Cracking or chipping occurred in the ink storage portion when the ink storage portion was stored for 1 month at 60° C.

(Bleeding of Image)

Through use of the ink jet recording apparatus described above, solid images of the respective inks of cyan, magenta and yellow each having a recording duty of 100% were recorded adjacent to each other on the recording medium. That is, the images include three adjacent portions. A glossy paper (product name "Canon Photo Paper Glossy Gold GL-101," manufactured by Canon Inc.) was used as the recording medium. The adjacent portions of the recorded solid images were visually observed, and then the bleeding of the image was evaluated in accordance with the evaluation criteria shown below.

A: No bleeding was observed in all of the adjacent portions of the images.

B: There was one adjacent portion in which the bleeding was observed.

C: There were two or more adjacent portions in which the bleeding was observed.

(Uniformity of Image)

Through use of the ink jet recording apparatus described above, solid images of three colors each having a recording duty of 33% were recorded on an entire surface of an A4-size recording medium. A glossy paper (product name "Canon Photo Paper Glossy Gold GL-101," manufactured by Canon Inc.) was used as the recording medium. Both edges of each of the recorded solid images were visually observed, and then the uniformity of the image was evaluated in accordance with the evaluation criteria shown below.

A: All of the solid images of the three colors had no color unevenness and were uniform.

B: A solid image of one color had color unevenness.

C: Solid images of two colors or more had color unevenness.

(Apparatus Size)

The apparatus 1 or 2 was modified so as to allow the recording unit to be mounted thereon. Then, the sizes of the apparatus before and after the modification were compared to evaluate the apparatus size in accordance with the evaluation criteria shown below.

A: Downsizing was achieved through modification.

B: An equivalent size was obtained through modification.

C: The size was increased through modification.

TABLE 4-1

| | | Evaluation conditions | | | | |
|---|---|---|---|---|---|---|
| | | | Recording unit | | | |
| | | Kind of apparatus | Kind | Ink corresponding to each ink storage portion a | b | c |
| Example | 1 | 1 | 1 | Magenta | Cyan | Yellow |
| | 2 | 1 | 1 | Magenta | Cyan | Yellow |
| | 3 | 1 | 1 | Magenta | Cyan | Yellow |
| | 4 | 1 | 1 | Magenta | Cyan | Yellow |
| | 5 | 1 | 1 | Magenta | Cyan | Yellow |
| | 6 | 1 | 1 | Magenta | Cyan | Yellow |
| | 7 | 1 | 2 | Yellow | Cyan | Magenta |
| | 8 | 1 | 3 | Cyan | Magenta | Yellow |
| | 9 | 1 | 1 | Magenta | Cyan | Yellow |
| | 10 | 1 | 1 | Magenta | Cyan | Yellow |

TABLE 4-1-continued

| | | Evaluation conditions | | | | |
|---|---|---|---|---|---|---|
| | | | Recording unit | | | |
| | | Kind of apparatus | Kind | Ink corresponding to each ink storage portion a | b | c |
| | 11 | 1 | 4 | Yellow | Magenta | Cyan |
| | 12 | 1 | 4 | Yellow | Magenta | Cyan |
| | 13 | 1 | 1 | Magenta | Cyan | Yellow |
| | 14 | 1 | 1 | Magenta | Cyan | Yellow |
| | 15 | 1 | 4 | Magenta | Cyan | Yellow |
| | 16 | 1 | 2 | Magenta | Cyan | Yellow |
| | 17 | 1 | 5 | Magenta | Cyan | Yellow |
| | 18 | 1 | 6 | Magenta | Cyan | Yellow |
| | 19 | 1 | 7 | Magenta | Cyan | Yellow |
| | 20 | 1 | 8 | Magenta | Cyan | Yellow |
| | 21 | 2 | 1 | Magenta | Cyan | Yellow |
| Comparative Example | 1 | 1 | 9 | Magenta | Cyan | Yellow |
| | 2 | 1 | 9 | Magenta | Cyan | Yellow |
| | 3 | 1 | 10 | Cyan | Magenta | Yellow |
| | 4 | 1 | 11 | Cyan | Magenta | Yellow |
| | 5 | 1 | 12 | Cyan | Magenta | Yellow |
| | 6 | 1 | 13 | Cyan | Magenta | Yellow |
| | 7 | 1 | 1 | Magenta | Cyan | Yellow |
| | 8 | 1 | 5 | Magenta | Yellow | Cyan |
| | 9 | 1 | 5 | Cyan | Yellow | Magenta |

TABLE 4-2

| | | Evaluation conditions | | | | | |
|---|---|---|---|---|---|---|---|
| | | Recording unit Length of horizontal part of ink flow path | | | Kind of ink | | |
| | | Short | Middle | Long | Cyan Ink | Magenta Ink | Yellow Ink |
| Example | 1 | Magenta | Cyan | Yellow | C1 | M1 | Y1 |
| | 2 | Magenta | Cyan | Yellow | C2 | M1 | Y1 |
| | 3 | Magenta | Cyan | Yellow | C1 | M2 | Y1 |
| | 4 | Magenta | Cyan | Yellow | C1 | M3 | Y1 |
| | 5 | Magenta | Cyan | Yellow | C1 | M1 | Y2 |
| | 6 | Magenta | Cyan | Yellow | C2 | M2 | Y2 |
| | 7 | Yellow | Cyan | Magenta | C1 | M1 | Y1 |
| | 8 | Cyan | Magenta | Yellow | C1 | M1 | Y1 |
| | 9 | Magenta | Cyan | Yellow | C3 | M1 | Y1 |
| | 10 | Magenta | Cyan | Yellow | C4 | M1 | Y1 |
| | 11 | Yellow | Magenta | Cyan | C5 | M4 | Y1 |
| | 12 | Yellow | Magenta | Cyan | C6 | M4 | Y1 |
| | 13 | Magenta | Cyan | Yellow | C7 | M1 | Y1 |
| | 14 | Magenta | Cyan | Yellow | C8 | M1 | Y1 |
| | 15 | Magenta | Cyan | Yellow | C9 | M1 | Y1 |
| | 16 | Magenta | Cyan | Yellow | C1 | M1 | Y3 |
| | 17 | Magenta | Cyan | Yellow | C1 | M1 | Y1 |
| | 18 | Magenta | Cyan | Yellow | C1 | M1 | Y1 |
| | 19 | Magenta | Cyan | Yellow | C1 | M1 | Y1 |
| | 20 | Magenta | Cyan | Yellow | C1 | M1 | Y1 |
| | 21 | Magenta | Cyan | Yellow | C1 | M1 | Y1 |
| Comparative Example | 1 | Magenta | Cyan | Yellow | C1 | M1 | Y1 |
| | 2 | Magenta | Cyan | Yellow | C1 | M1 | Y3 |
| | 3 | Magenta | Cyan · Yellow | | C1 | M1 | Y1 |
| | 4 | Magenta | Cyan · Yellow | | C1 | M1 | Y1 |
| | 5 | Magenta | Magenta · Yellow | | C1 | M1 | Y1 |
| | 6 | Magenta | Magenta · Yellow | | C1 | M1 | Y1 |
| | 7 | Magenta | Cyan | Yellow | C1 | M1 | Y3 |
| | 8 | Magenta | Yellow | Cyan | C10 | M5 | Y4 |
| | 9 | Cyan | Yellow | Magenta | C10 | M5 | Y4 |

TABLE 4-3

| | | Evaluation results | | | |
|---|---|---|---|---|---|
| | | Evaluation results | | | |
| | | Strength | Bleeding | Uniformity | Apparatus size |
| Example | 1 | A | A | A | A |
| | 2 | A | A | A | A |
| | 3 | A | A | A | A |
| | 4 | A | A | A | A |
| | 5 | A | A | A | A |
| | 6 | A | A | A | A |
| | 7 | A | A | B | A |
| | 8 | A | A | B | A |
| | 9 | A | A | A | A |
| | 10 | A | A | B | A |
| | 11 | A | B | A | A |
| | 12 | A | A | A | A |
| | 13 | A | A | A | A |
| | 14 | A | A | B | A |
| | 15 | A | B | A | A |
| | 16 | A | B | A | A |
| | 17 | A | A | B | B |
| | 18 | A | A | A | A |
| | 19 | A | A | A | A |
| | 20 | B | A | A | A |
| | 21 | A | A | A | A |
| Comparative Example | 1 | C | A | A | A |
| | 2 | C | C | A | A |
| | 3 | C | A | A | A |
| | 4 | C | A | A | A |
| | 5 | C | A | A | A |
| | 6 | C | A | A | A |
| | 7 | A | C | A | A |
| | 8 | A | C | C | A |
| | 9 | A | C | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-128302, filed Aug. 7, 2023, and Japanese Patent Application No. 2024-117457, filed Jul. 23, 2024, which are hereby incorporated by reference herein in their entirety.

What is claimed is:

1. An ink jet recording method using an ink jet recording apparatus comprising:

an aqueous ink comprising a dye;

an ink storage portion that is configured to store the aqueous ink, and is formed from a thermoplastic resin composition comprising a filler material; and a recording head to be bonded to the ink storage portion, the recording head having formed therein an ejection orifice array configured to eject the aqueous ink supplied from the ink storage portion, the ink jet recording method comprising recording an image by applying the aqueous ink ejected from the ejection orifice array to a recording medium, wherein the ink storage portion comprises three or more storage parts divided independently of each other by a partition portion arranged orthogonal to a longitudinal direction of the ink storage portion, the three or more storage parts being arrayed in one predetermined direction, wherein the aqueous ink comprises a cyan ink, a magenta ink, and a yellow ink, wherein the ejection orifice array comprises three rows of ejection orifice arrays corresponding to the cyan ink, the magenta ink, and the yellow ink, respectively, the three rows of ejection orifice arrays being formed in the recording head along the longitudinal direction of the ink storage portion, and wherein among the three rows of ejection orifice arrays corresponding to the cyan ink, the magenta ink, and the yellow ink, respectively, an ink corresponding to the ejection orifice array arranged at a middle out of the three rows of ejection orifice arrays has a smallest dynamic surface tension $\gamma 10$ at a lifetime of 10 milliseconds.

2. The ink jet recording method according to claim 1, wherein the ink jet recording apparatus further comprises an ink flow path comprising a horizontal part through which the aqueous ink flows between the ink storage portion and an ejection orifice of the ejection orifice array, and the horizontal part corresponding to an ink having a smallest static surface tension (mN/m) out of the cyan ink, the magenta ink and the yellow ink has a largest length.

3. The ink jet recording method according to claim 1, wherein an ink having the largest content of the dye out of the cyan ink, the magenta ink and the yellow ink is stored in a corresponding one of the three or more storage parts arranged on an inner side.

4. The ink jet recording method according to claim 1, wherein a difference ($\eta 1-\eta 2$) between a largest viscosity $\eta 1$ (mPa·s) and a smallest viscosity $\eta 2$ (mPa·s) out of viscosities of the cyan ink, the magenta ink and the yellow ink is 0.2 mPa·s or less.

5. The ink jet recording method according to claim 1, wherein a difference ($\gamma s1-\gamma s2$) between a static surface tension $\gamma s1$ (mN/m) of an ink having a smallest lightness and a static surface tension $\gamma s2$ (mN/m) of an ink having a largest lightness out of static surface tensions of the cyan ink, the magenta ink and the yellow ink is 0.0 mN/m or more to 2.0 mN/m or less.

6. The ink jet recording method according to claim 1, wherein the three rows of ejection orifice arrays are arranged in order of a lightness of a corresponding ink.

7. The ink jet recording method according to claim 1, wherein the ink storage portion has a ratio (A/B) of a length A in the longitudinal direction to a length B in a transverse direction orthogonal to the longitudinal direction, the ratio (A/B) being 2.0 times or more to 4.4 times or less.

8. The ink jet recording method according to claim 1, wherein the ink storage portion is replaced with another ink storage portion after the aqueous ink stored therein has been consumed.

9. The ink jet recording method according to claim 1, wherein the ink jet recording apparatus further comprises:

a second ink storage portion having a capacity larger than a capacity of the ink storage portion; and a tube through which the aqueous ink flows between the second ink storage portion and the ink storage portion.

10. The ink jet recording method according to claim 1, wherein each of the partition portions is in contact with an outer peripheral wall of the ink storage portion at two distinct portions.

11. The ink jet recording method according to claim 1, wherein the aqueous ink corresponding to the ejection orifice array arranged at the middle out of the three rows of ejection orifice arrays is stored in a storage part positioned on an inner side among the three or more storage parts.

12. The ink jet recording method according to claim 1, wherein the filler material comprises a glass fiber.

13. An ink jet recording apparatus comprising:

an aqueous ink comprising a dye;

an ink storage portion that is configured to store the aqueous ink, and is formed from a thermoplastic resin composition comprising a filler material; and a recording head to be bonded to the ink storage portion, the recording head having formed therein an ejection orifice array configured to eject the aqueous ink supplied from the ink storage portion, wherein the ink storage portion comprises three or more storage parts divided independently of each other by a partition portion arranged orthogonal to a longitudinal direction of the ink storage portion, the three or more storage parts being arrayed in one predetermined direction, wherein the aqueous ink comprises a cyan ink, a magenta ink, and a yellow ink, wherein the ejection orifice array comprises three rows of ejection orifice arrays corresponding to the cyan ink, the magenta ink, and the yellow ink, respectively, the three rows of ejection orifice arrays being formed in the recording head along the longitudinal direction of the ink storage portion, and wherein among the three rows of ejection orifice arrays corresponding to the cyan ink, the magenta ink, and the yellow ink, respectively, an ink corresponding to the ejection orifice array arranged at a middle out of the three rows of ejection orifice arrays has a smallest dynamic surface tension γ10 at a lifetime of 10 milliseconds.

* * * * *